US008136874B2

(12) United States Patent
Negrini et al.

(10) Patent No.: US 8,136,874 B2
(45) Date of Patent: Mar. 20, 2012

(54) FLUIDIC CLIMATE CONTROL SYSTEM FOR A SEAT

(75) Inventors: Milton Jose Negrini, Sào Paulo (BR); Gregory A. Major, Farmington Hills, MI (US); William R. Hill, Troy, MI (US); Pega Hrnjak, Urbana, IL (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 12/474,759

(22) Filed: May 29, 2009

(65) Prior Publication Data

US 2010/0301642 A1    Dec. 2, 2010

(51) Int. Cl.
*A47C 7/72* (2006.01)
(52) U.S. Cl. .......... 297/180.11; 297/180.15; 297/452.43
(58) Field of Classification Search ............. 297/452.42, 297/452.43, 180.11–180.15
See application file for complete search history.

(56) References Cited

U.S. PATENT DOCUMENTS

| 5,107,684 | A | * | 4/1992 | Nakayama et al. | ............... | 62/81 |
| 5,354,117 | A | * | 10/1994 | Danielson et al. | ....... | 297/180.15 |
| 5,524,439 | A | * | 6/1996 | Gallup et al. | ..................... | 62/3.5 |
| 5,613,730 | A | * | 3/1997 | Buie et al. | ................ | 297/180.12 |
| 6,062,641 | A | * | 5/2000 | Suzuki et al. | ............ | 297/180.1 |
| 6,254,179 | B1 | * | 7/2001 | Kortum et al. | ............ | 297/180.12 |
| 6,619,736 | B2 | * | 9/2003 | Stowe et al. | ............ | 297/180.14 |
| 7,274,007 | B2 | * | 9/2007 | Fernandez et al. | ............ | 219/497 |
| 2005/0184565 | A1 | * | 8/2005 | Weiss et al. | ............. | 297/180.15 |
| 2006/0059933 | A1 | | 3/2006 | Axakov et al. | | |
| 2007/0035162 | A1 | * | 2/2007 | Bier et al. | ................ | 297/180.15 |
| 2009/0250980 | A1 | * | 10/2009 | Major et al. | ............. | 297/180.15 |

* cited by examiner

*Primary Examiner* — Sarah B McPartlin
(74) *Attorney, Agent, or Firm* — Quinn Law Group, PLLC

(57) ABSTRACT

A fluid-based or fluidic climate control system for a seat includes first and second portions positionable adjacent to first and second surfaces of the seat and a fluid control module (FCM) for circulating fluid in a closed-loop within the portions. The FCM delivers fluid to the portions at independently-controllable temperatures. An interface may be used to control the temperatures. The FCM may include a heat exchanger module (HEM) having a fan connected to an energy storage device (ESD). The FCM may include a miniature vapor compressor for circulating the fluid. A method of cooling a seat includes positioning first and second portions of the system adjacent to different surfaces of the seat, and using the FCM to circulate fluid within a closed-loop passage of the portions while independently controlling the temperature of the fluid, and thus the portions, using a user interface.

14 Claims, 3 Drawing Sheets

US 8,136,874 B2

FLUIDIC CLIMATE CONTROL SYSTEM FOR A SEAT

TECHNICAL FIELD

The present invention relates generally to vehicle climate control systems, and more specifically to a portable climate control system for selectively heating and/or cooling different surfaces of a seat.

BACKGROUND OF THE INVENTION

In a vehicle climate control system, heating and air conditioning systems may be used to respectively direct warm and cold air into a passenger compartment of the vehicle. Control devices in some vehicles allow different passengers to select a desired temperature setting for the air that is discharged from a vent located in their particular section of the passenger compartment. Other vehicles may be equipped with seat warming devices which pass a warming electrical current through conductive coils embedded within the vehicle seat. For cooling, air ducts may be routed through the seat base to discharge cool air through the surfaces of the vehicle seat.

Thermoelectric systems transfer heat by applying a DC voltage to sides of a semiconductor to create a temperature differential. A corresponding transfer of heat occurs between the sides, which may be constructed of different materials to enhance the heat transfer effect. Thermoelectric systems have certain size and weight advantages as they do not require use of a heat transfer fluid within a conventional evaporating/condensing unit. However, the potential advantages of thermoelectric devices when used in conjunction with a vehicle climate control system may be offset by their relative energy inefficiency and durability.

SUMMARY OF THE INVENTION

Accordingly, a self-contained or a closed-loop climate control system is provided for use with a seat, such as but not limited to a vehicle seat. The system is portable, i.e., it is not permanently integrated with the structure of the seat itself, and therefore when used with a vehicle seat it may be used as an aftermarket device within more than one vehicle in order to provide a relatively energy efficient alternative to a thermoelectric-based system as described above. The system has separate seat and back portions each containing an internal network of flexible tubing.

A fluid control module (FCM) is connected to the seat and back portions and may be draped in front of a vehicle seat cushion or stowed underneath such a cushion. The FCM contains a miniature vapor compressor, a heat exchanger module (HEM) having condensing and evaporating capabilities, and a set of control valves each automatically operated in response to temperature commands transmitted from a compact user interface. Actuation of the valves directs the fluid as needed to achieve a desired seat temperature.

The miniature compressor circulates a suitable fluid, e.g., a refrigerant such as R134a or other suitable coolant, in a closed-loop fluid circuit in the seat and back portions. When positioned adjacent to different surfaces or cushions of a vehicle seat, the back portion may be immediately adjacent to the back cushion and the seat portion may be immediately adjacent to the seat cushion. Selective heating and cooling of the back and seat portions is provided using the user interface, which allows heating or cooling of the back and seat portions together, cooling of the seat portion with heating of the back portion, or cooling of the back portion with heating of the seat portion. The system may be powered by the vehicle's auxiliary power system in one embodiment, or may be provided with its own power supply in another embodiment.

In particular, a climate control system for use with a seat includes a first portion that may be positioned adjacent to a first surface of the seat, a second portion that may be positioned adjacent to a second surface of the seat, and an FCM operable for circulating a supply of fluid within a closed-loop fluid passage within the first and second portions. The FCM delivers the fluid to the first portion at a first temperature and to the second portion at a second temperature, with the first and second temperatures being independently controllable. The user interface may be used to control the temperatures, and may include a pair of temperature input devices, e.g., knobs or buttons, each adapted for controlling a temperature of a corresponding one of the back and seat portions. The FCM may include a heat exchanger module (HEM) having an electric fan that is electrically connected to an energy storage device (ESD) and cooled thereby, e.g., an auxiliary vehicle power supply or a separate battery pack. The FCM may include a miniature vapor compressor for compressing the fluid and for circulating the fluid through the closed-loop fluid passage.

A method of cooling a seat includes positioning a first portion of a climate control system adjacent to a first surface of the seat, positioning a second portion of the climate control system adjacent to a second surface of the seat, using the FCM to circulate fluid within a closed-loop fluid passage of the first and second portions, and independently controlling the temperature of the fluid in the different portions using the user interface.

The above features and advantages and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
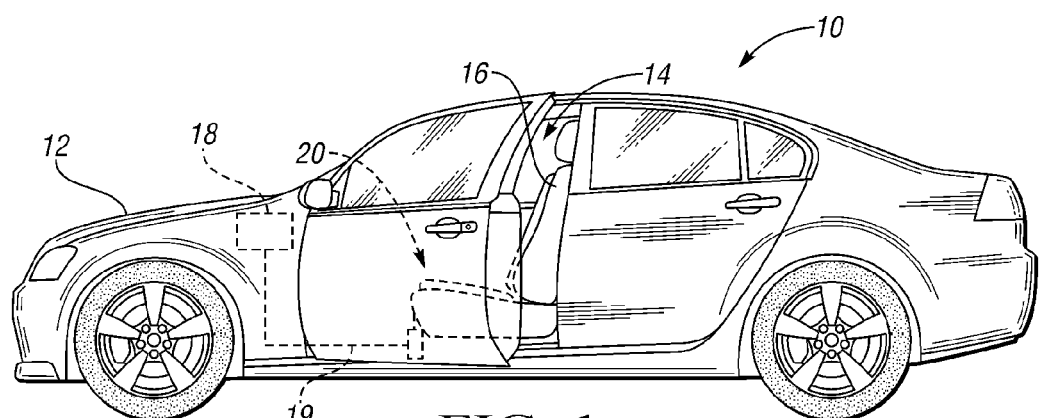
FIG. 1 is a perspective view illustration of a vehicle having a seat that is usable with a portable climate control system (CCS) in accordance with the invention.

Referring to the drawings wherein like reference numbers refer to like components throughout the several views, and beginning with FIG. 1, a vehicle 10 includes a body 12 defining a passenger compartment 14. While the body 12 is configured as a sedan in the embodiment shown in FIG. 1, the body may also be configured as a pickup truck, a sport utility vehicle, a crossover vehicle, or any other vehicle body defining a passenger compartment 14. The vehicle 10 includes an energy storage device (ESD) 18 such as a 12-volt onboard auxiliary battery suitable for powering one or more vehicle accessories aboard the vehicle 10, or a power pack separate from the auxiliary battery as described below.

Within the scope of the invention, the seat 16 may be equipped with a portable climate control system 20. The system 20 may be electrically connected to the ESD 18 using wires 19 or a wiring harness to provide the electrical current needed for powering the various fluid control devices within the system 20 as set forth below. The ESD 18 may be an under-seat power pack that is separate from the vehicle's auxiliary power system according to one embodiment, the 12-volt auxiliary battery noted above, or another battery pack or suitable energy source.

The surfaces of the seat 16 may be hot or cold to the touch, with the temperature changing with the particular season. System 20 therefore provides a portable climate control device that is capable of covering the seat 16, thus allowing a user to transport the system 20 between different vehicles, or to move the system 20 between different seats 16 within the same vehicle. The system 20 may be provided as optional equipment for vehicle 10, or may be provided on an aftermarket basis for use in vehicle 10 or any other vehicle having a seat 16. Those of ordinary skill in the art will recognize that although vehicular applications are well suited for use with the system 20, the system 20 is not limited to vehicular applications, and may be used in conjunction with other seats, e.g., lawn chairs, theater seats, stadium seats, etc., without departing from the intended scope of the invention.

Figure 2:
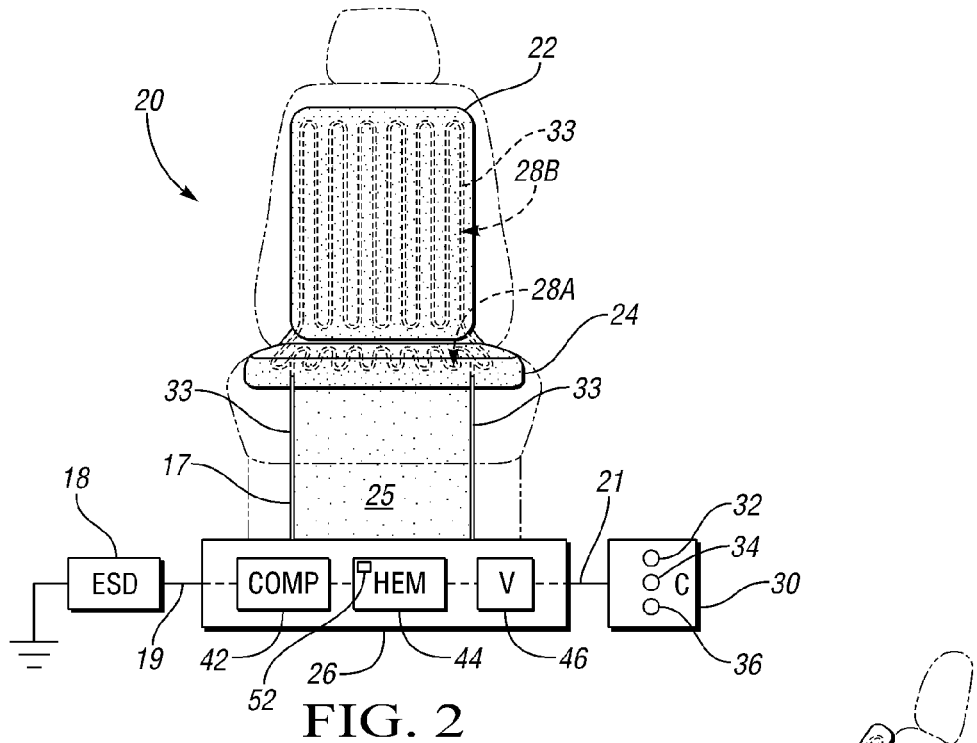
FIG. 2 is a schematic front view illustration of the portable CCS usable within the vehicle of FIG. 1.
Figure 3:
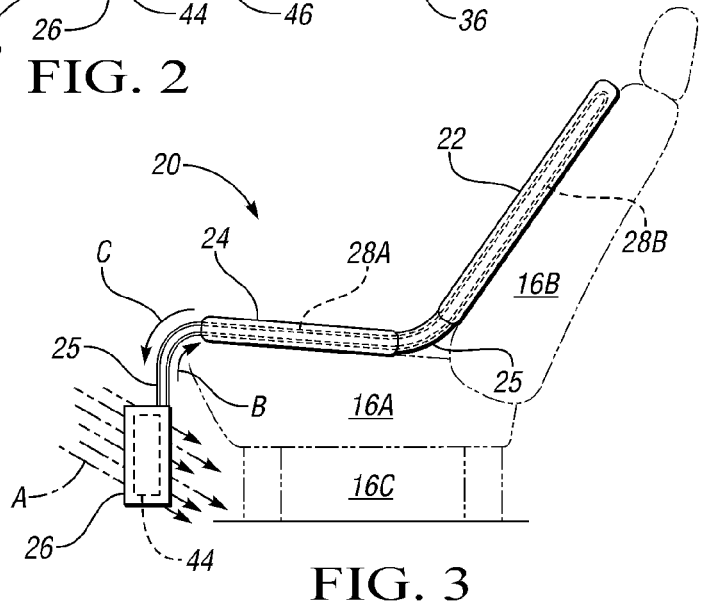
FIG. 3 is a schematic side view illustration of the portable CCS of FIG. 2.

Referring to FIG. 2, in one embodiment the system 20 includes a back portion 22, a seat portion 24, connecting portions 25, and a fluid control module (FCM) 26. The back portion 22 and the seat portion 24 may be placed over or positioned adjacent to a back cushion 16B and seat cushion 16A of the seat 16 as shown in FIG. 3. The system 20 may also be embodied as a single cushion without departing from the intended scope of the invention. The system 20 may be removably connected to the seat 16 to allow portability of the system between different seats 16, whether the seats are vehicle seats or other non-vehicular seats. The FCM 26 may be electrically connected to the ESD 18 via the wires 19, and operation of the FCM 26 may be selectively controlled by a user through an interface 30 as described below.

The FCM 26 includes a vapor compressor (COMP) 42, a heat exchanger module (HEM) 44, and a set of control valves (V) 46. The HEM 44 is capable of acting as an evaporator or a condenser as needed, and includes a small electric fan 52 for facilitating heat transfer within the HEM 44. As shown in FIGS. 4A-D, the valves 46 may include a 4-way master control valve 67, a thermal expansion valve 65, and a plurality of on/off valves 60, 62, 64, 66, and 68, with the valves 46 selectively controlled as described below with reference to FIGS. 4A-D to provide a desired heating/cooling experience.

Still referring to FIG. 2, the system 20 includes coils 28A, 28B in the seat portion 24 and back portion 22, respectively, with the coils 28A, 28B defining an internal fluid passage 33. The fluid passage 33 forms a closed-loop or self-contained fluid circuit between the FCM 26 and the respective back and seat portions 22, 24. Using the compressor 42, fluid 17 such as R134a or another suitable coolant or refrigerant, is moved in liquid and/or gaseous states through the passage 33, with the state of the fluid 17 being dependent on the particular heating/cooling cycle. That is, when operating as a condenser the HEM 44 receives fluid 17 from the compressor 42 and allows heat to dissipate, whereupon the fluid 17 expands via the thermal expansion valve 65 (see FIGS. 4A-D). The temperature of the fluid 17 is rapidly decreased. The cold fluid, which is now at a low-pressure, is evaporated by the HEM 44 to change to a gaseous state. The gaseous fluid 17 may then be compressed by the compressor 42, and the cycle repeats.

A desired seat temperature may be selectively varied using the interface 30. For example, in one embodiment the interface 30 may include an on/off switch or button 32 and temperature input devices 34 and 36 each dedicated to controlling the temperature of a respective one of the back and seat portions 22 and 24. The interface 30 may connect to the FCM 26 through a connection 21, which may be a hardwired connection or a remote/wireless link depending on the desired design. When hardwired, the length of connection 21 may be relatively short to ensure that the interface 30 remains in close proximity to the FCM 26, or may be long so as to place the interface a distance away from the FCM 26 at a conveniently accessible position within the passenger compartment, e.g., on an instrument panel or a shift lever. A remote/wireless link likewise would allow the interface 30 to be positioned anywhere within the passenger compartment 14 of FIG. 1.

Referring to FIG. 3, the HEM 44 of FCM 26 requires a free flow of air to provide the required heat transfer, with the airflow represented in FIG. 3 by arrows A. Such airflow may be enabled by draping the FCM 26 with respect to the seat portion 24 of FIG. 3, with air flowing into a space beneath the seat 16. The FCM 26 is thus adapted for stowage adjacent to a base 16C of the seat 16. Fluid 17 is allowed to flow within the coils 28A, 28B as indicated by arrows B, flowing through the seat portion 24 and the back portion 22 before returning to the FCM 26 for recirculation. A self-contained or closed-loop fluid circuit is thus formed. In one embodiment, the coils 28A, 28B may be constructed of a flexible and resilient material to ensure the physical integrity and long term durability of the coils 28A, 28B in the presence of a compressive force, i.e., a user sitting on the system 20 during its use with the seat 16 of FIG. 1.

Figure 4A:
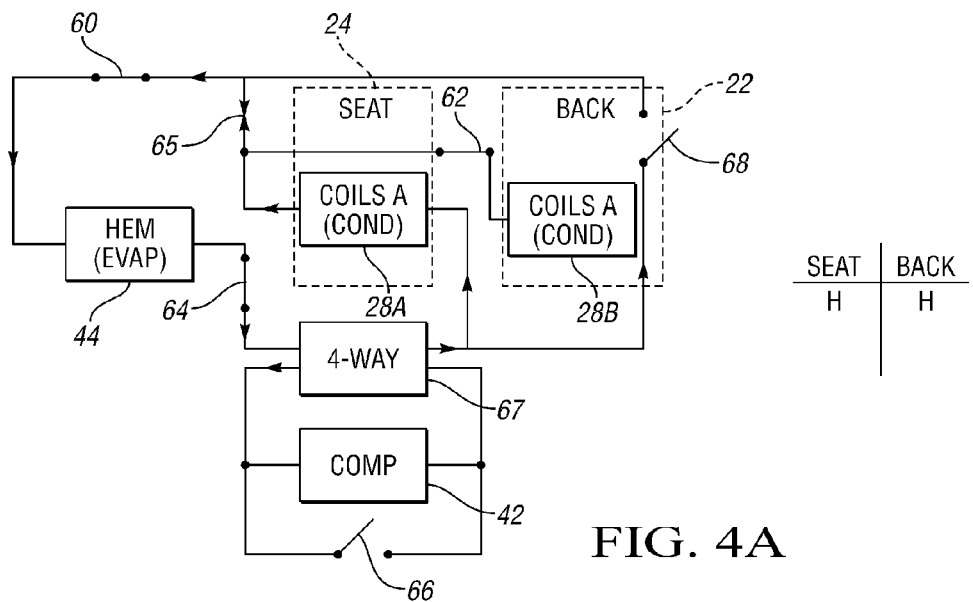
FIG. 4A is a schematic fluid circuit diagram describing fluid flow for a first climate configuration for the portable CCS of FIGS. 2 and 3.

Referring to FIG. 4A, the system 20 may be controlled to provide a first climate configuration wherein both the back portion 22 and the seat portion 24 are heated. A user may utilize the interface 30 of FIGS. 2 and 3 to select such an option, such as by turning the on/off switch 32 to an "on" position and turning each of the devices 34, 36 to a desired temperature. In response to these commands the valves 60, 62, and 64 are closed and valves 66 and 68 are opened. For simplicity, valves 60, 62, 64, 66, and 68 are represented as schematic open/closed switches, and may be embodied by any dual-state fluid control device.

The compressor 42 delivers fluid 17 at an increased temperature under pressure to the 4-way control valve 67. The valve 67 actuates to deliver the fluid 17 to the coils 28A, 28B. The heated fluid 17 is directed through the passage 33 of coils 28A, 28B. After passing through the back portion 22, the fluid 17 is directed through the valve 62. The fluid 17 then passes through thermal expansion valve 65 and the valve 60, rapidly dropping the pressure and temperature of the fluid 17. The now cold and primarily gaseous fluid 17 is directed to the HEM 44, wherein an evaporating processes occurs before returning the fluid 17 to the compressor 42 through the valve 67. The cycle repeats until the user selects a different setting using the interface 30.

Figure 4B:
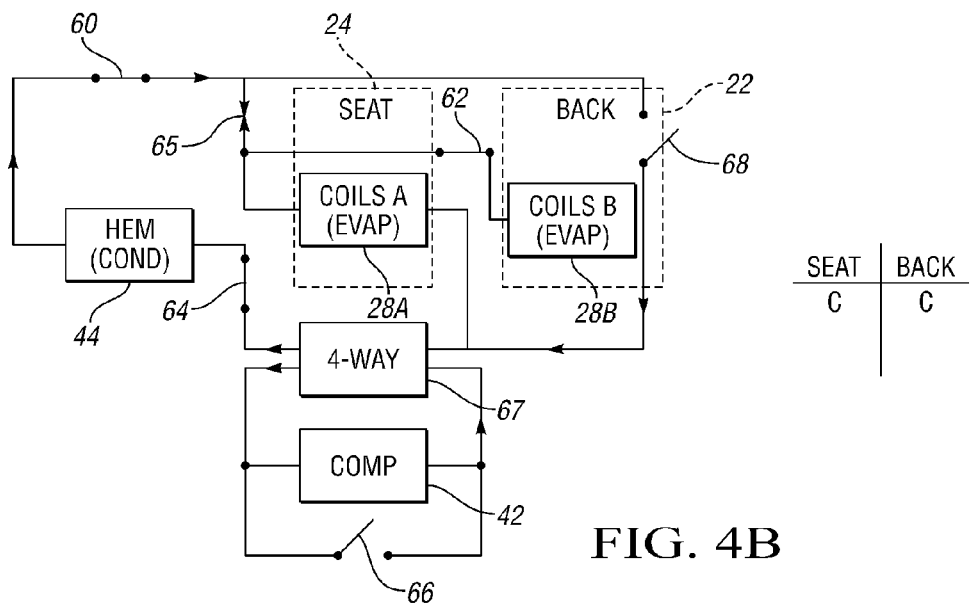
FIG. 4B is a schematic fluid circuit diagram describing fluid flow for a second climate configuration for the portable CCS of FIGS. 2 and 3.

Referring to FIG. 4B, the system 30 may be controlled to provide a second climate configuration wherein the back portion 22 and the seat portion 24 are cooled. A user may utilize the interface 30 of FIGS. 2 and 3 to select such an option, and in response the valves 60, 62, and 64 are closed while the valves 66 and 68 are opened. The compressor 42 delivers fluid 17 under pressure to the 4-way control valve 67 as before. However, in this embodiment the heated and high-pressure fluid 17 is directed to the HEM 44 for condensing before passing through valve 60 and into thermal expansion valve 67. Cool fluid 17 then passes through the coils 28A of the seat portion 24 and through the valve 62 to the coils 28B of the back portion 22, thereby cooling the back portion 22 and seat portion 24. After passing through the seat portion 24 and back portion 22, the fluid 17 returns to the 4-way valve 67 and is circulated in a closed-loop until the user selects a different setting using the interface 30.

Figure 4C:
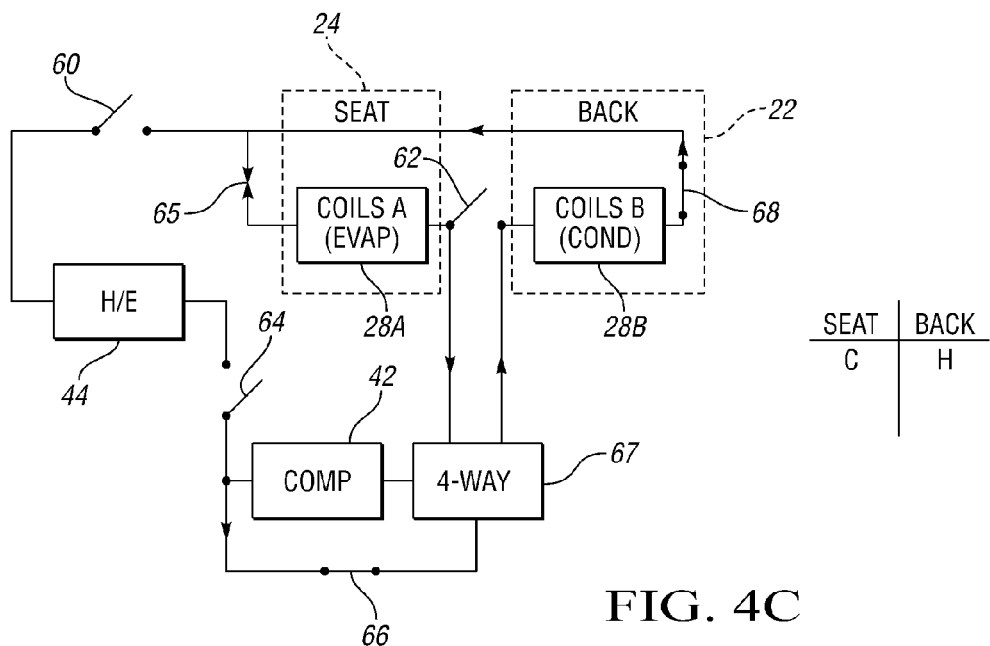
FIG. 4C is a schematic fluid circuit diagram describing fluid flow for a third climate configuration for the portable CCS of FIGS. 2 and 3.

Referring to FIG. 4C, the system 30 may be controlled to provide a third climate configuration wherein the seat portion 24 is cooled and the back portion 22 is heated. A user may utilize the interface 30 of FIGS. 2 and 3 to select such an option, and in response valves 60, 62, and 64 are opened, while valves 66 and 68 are closed. Fluid 17 from the compressor 42 enters the 4-way valve 67 and is directed into the coils 28B of the back portion 22, thus heating the back portion. Thereafter, the warm fluid 17 passes through valve 68 and to the thermal expansion valve 65. The open valve 60 directs all fluid flow into the valve 65. Upon expansion, the cold fluid 17 passes through coils 28A of the seat portion 24, thereby cooling the seat portion 24. The fluid 17 returns to the compressor 42 via the 4-way valve 67 and the cycle repeats in a closed-loop until the user selects a different setting using the interface 30.

Figure 4D:
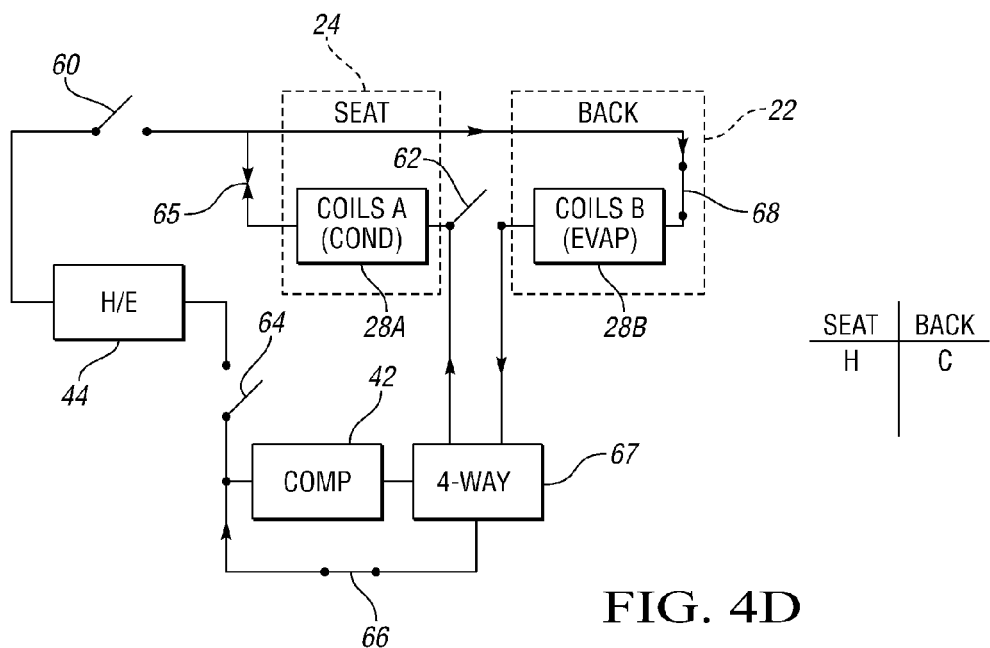
FIG. 4D is a schematic fluid circuit diagram describing fluid flow for a fourth climate configuration for the portable CCS of FIGS. 2 and 3.

Referring to FIG. 4D, the system 30 may be controlled to provide a fourth climate configuration wherein the seat portion 24 is heated and the back portion 22 is cooled. A user may utilize the interface 30 of FIGS. 2 and 3 to select such an option, and in response valves 60, 62, and 64 remain open and valves 66 and 68 remain closed. Warm fluid 17 that is discharged from the compressor 42 enters the 4-way valve 67, which is actuated to direct the fluid 17 to the coils 28A of the seat portion 24, thereby heating the seat portion 24. Thereafter, the heated fluid 17 passes through the thermal expansion valve 65 and undergoes expansion and cooling. The open valve 60 ensures that all of the fluid 17 is directed into the coils 28B of the back portion 22 through the valve 68, thereby cooling the back portion 22. Fluid 17 then returns to the compressor 42 though the valve 67 and the cycle repeats in closed-loop until the user selects a different setting using the interface 30.

While the best modes for carrying out the present invention have been described in detail, those familiar with the art to which this invention relates will recognize various alternative designs and embodiments for practicing the invention within the scope of the appended claims.

The invention claimed is:

1. A portable climate control system for use with a seat, the system comprising:
   a first portion that is removably positionable over a first surface of the seat to thereby cover the first surface;
   a second portion that is removably positionable over a second surface of the seat to thereby cover the second surface, wherein each of the portions contains respective coils; and
   a fluid control module (FCM) in fluid communication with the coils of each of the first and second portions to thereby define a closed-loop fluid passage between the FCM and the first and second portions, wherein the FCM circulates a supply of refrigerant only within the closed-loop fluid passage and includes a plurality of valves which selectively deliver the refrigerant to the first and second portions at independently-controllable temperatures;
   wherein the first portion, the second portion, and the FCM are removably connected to the seat to allow portability of the system between different seats.

2. The system of claim 1, including a user interface in electrical communication with the FCM, and having a pair of temperature input devices each controlling a temperature of a corresponding one of the first and the second portions.

3. The system of claim 1, further comprising an energy storage device (ESD), wherein the FCM includes a heat exchanger module (HEM) having an electric fan that is electrically connected to the ESD.

4. The system of claim 1, wherein the FCM includes a miniature vapor compressor that compresses and circulates the refrigerant through the closed-loop fluid passage.

5. The system of claim 1, wherein the FCM is positioned adjacent to a base of the seat and admits a flow of air through the FCM and into a space beneath the seat.

6. A portable climate control system for use with a vehicle seat, the system comprising:
   a back portion covering a back cushion of the vehicle seat;
   a seat portion covering a seat cushion of the vehicle seat; and
   a fluid control module (FCM) circulating a supply of refrigerant within a closed-loop fluid passage within the seat portion and the back portion, the FCM including a vapor compressor, a thermal expansion valve, a four-way valve, and a heat exchanger;
   wherein the FCM selectively circulates the refrigerant:
      to the back portion at a first temperature through a four-way valve of the FCM to heat the back portion, through coils of the back portion, through a thermal expansion valve of the FCM, to coils of the seat portion at a second temperature to cool the seat portion, and back to the four-way valve;
      to the coils of the seat portion at the first temperature through the four-way valve to heat the seat portion, through the thermal expansion valve, to the coils of the back portion at the second temperature to cool the back portion, and back to the four-way valve;
      through the four-way valve, the heat exchanger, and the thermal expansion valve to the coils of the seat and back portions and back to the four-way valve to simultaneously cool the seat and back portions; and
      through the four-way valve, to the coils of each of the seat and back portions, through the thermal expansion valve and heat exchanger, and back to the four-way valve to simultaneously heat the seat and back portions;
   wherein each of the first and second temperatures are independently-controllable and the system is removably connected to the vehicle seat to allow portability of the system between different vehicles.

7. The system of claim 6, including a user interface that is electrically connected to the FCM, and having a pair of temperature input devices each controlling a temperature of a corresponding one of the back and seat portions.

8. The system of claim 7, wherein the user interface mounts to a surface of the vehicle seat and is in wireless communication with the FCM.

9. The system of claim 6, further comprising an energy storage device (ESD), wherein the FCM includes a heat exchanger module (HEM) having an electric fan that is electrically connected to the ESD.

10. The system of claim 9, wherein the ESD is one of a 12-volt auxiliary power system of the vehicle and a power pack separate from the auxiliary system.

11. A method of cooling a seat comprising:
positioning a first portion of a climate control system over and adjacent to a first external surface of the seat;
positioning a second portion of the climate control system over and adjacent to a second external surface of the seat, wherein each of the first and second portions includes coils;
connecting a fluid control module (FCM) in fluid communication with the coils of each of the first and second portions to thereby form a closed-loop fluid passage between the FCM and the coils of the first and second portions, wherein the FCM includes a vapor compressor and a plurality of valves;
circulating a refrigerant only within the closed-loop fluid passage of the first portion and the second portion, including compressing the refrigerant using the vapor compressor and actuating the valves; and
independently controlling the temperature of the first and the second portions using a user interface.

12. The method of claim 11, wherein positioning a first portion and a second portion of a climate control system over and adjacent to a first external surface and a second external surface of the seat includes temporarily connecting a back portion and seat portion of the system to a respective back cushion and seat cushion of a vehicle seat.

13. The method of claim 12, wherein the valves include a four-way valve, a thermal expansion valve, and a heat exchanger, and wherein circulating the refrigerant includes selectively circulating the refrigerant:
to coils of the seat portion through the four-way valve and to the thermal expansion valve, through the thermal expansion valve to the coils of the back portion, through the coils of the back portion, and back to the four-way valve to thereby heat the seat portion and cool the back portion;
to coils of the back portion through the four-way valve and to the thermal expansion valve, through the thermal expansion valve to the coils of the seat portion, through the coils of the seat portion, and back to the four-way valve to thereby cool the seat portion and heat the back portion;
through the four-way valve, the heat exchanger, and the thermal expansion valve in series and into the coils of each of the seat and back portions to cool the seat and back portions; and
through the four-way valve to the coils of the seat and back portions, though the coils of the seat and back portion, and then back to the heat exchanger to simultaneously heat the seat and back portions.

14. The method of claim 11, wherein independently controlling the temperature of the first and the second portions using a user interface includes using a first control input device of the interface to set a temperature of the first portion to a warm temperature, and using a second control input device of the user interface to set a temperature of the second portion to a cool temperature.

* * * * *